March 22, 1960
C. G. PAPACOSTA
2,929,637
IMPACT ABSORBING SAFETY DEVICE
Filed March 25, 1959
2 Sheets-Sheet 1
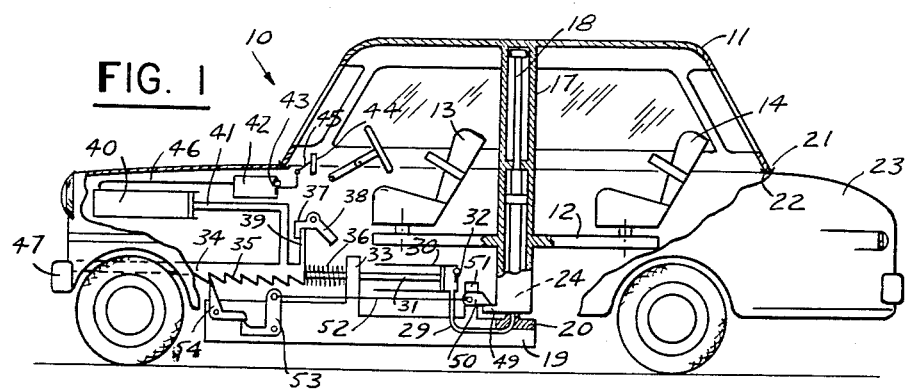
FIG. 1
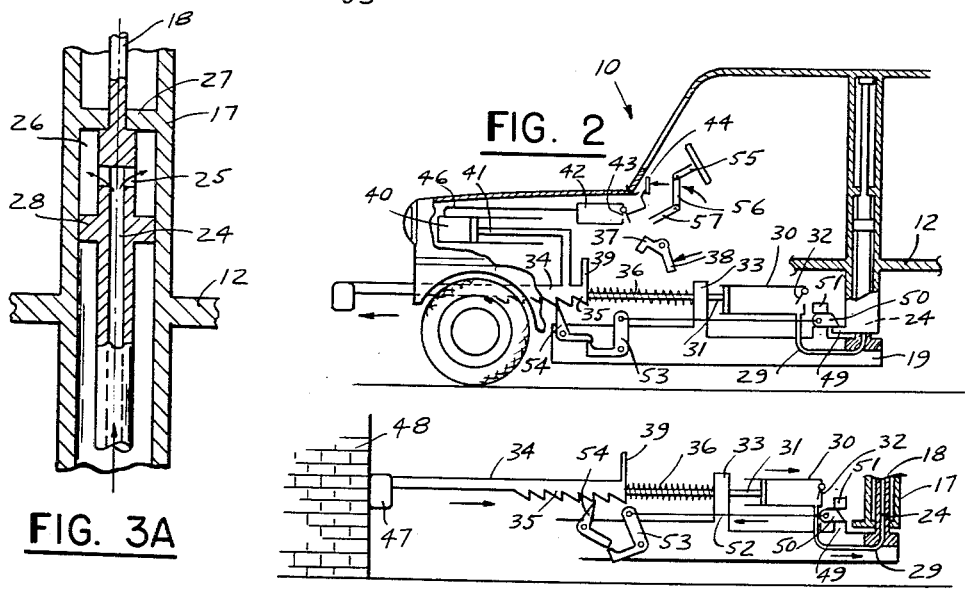
FIG. 3A
FIG. 2
FIG. 3
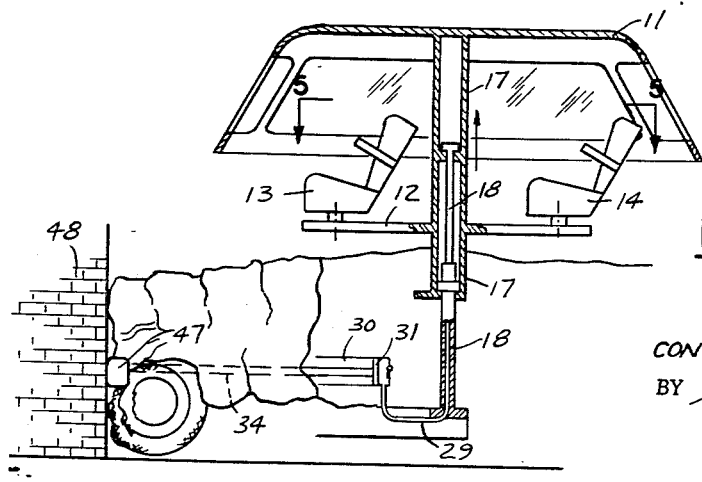
FIG. 4
INVENTOR.
CONSTANTINE G. PAPACOSTA
BY George Spector
AGENT March 22, 1960

C. G. PAPACOSTA 2,929,637

IMPACT ABSORBING SAFETY DEVICE

Filed March 25, 1959

INVENTOR.
CONSTANTINE G. PAPACOSTA
BY George Spector

AGENT

2,929,637

IMPACT ABSORBING SAFETY DEVICE

Constantine George Papacosta, Brooklyn, N.Y.

Application March 25, 1959, Serial No. 801,804

4 Claims. (Cl. 280—29)

This invention relates to a novel device which will protect passengers in autos, boats, airplanes, etc. from the effects of a collision by an impact absorbing device.

Although the device is hereinafter described in connection with a passenger vehicle, it obviously can be used in other means of transportation such as boats, elevators, trains, airplanes, etc.

According to the instant invention the impact energy is used to raise the vehicular occupants out of harm's way by pneumatic means. This is accomplished by the projection of a piston in front of the vehicle when the operator realizes that a collision is about to occur. The piston is first to contact the obstruction and forced by such contact to telescope back into the vehicle. This telescopic movement is used to pneumatically raise the central portion of the vehicle in which the passengers are seated to a position above the body of the vehicle. Thus when the front end of the vehicle crashes into the obstruction, the passengers have been moved to a relatively safe position above the body of the vehicle. Consequently the ensuing damage to the body is much less likely to involve the occupants. Although the passengers are not directly in the path of the damage occurring from the collision, there is still danger from the sudden stoppage of the vehicle. This danger is reduced by causing the raised portion of the vehicle in which the passengers are seated to rotate upon the occurrence of a collision as will be described in more detail.

Consequently the primary object of this invention is the provision of a vehicle which upon the occurrence of a collision will absorb part of the impact energy to raise the occupants out of harm's way and thereby reduce the damage wrought by the collision.

Another object of this invention is a device which will utilize the impact energy of a collision to move the occupants out of harm's way whereby the extent of such movement is a function of the speed of the vehicle prior to the collision.

Additional inventive objects and novel features will be made clearer in the ensuing detailed description, claims and attached drawings in which:

Figure 1 is a side elevation of a passenger vehicle with the side of the body removed to show details of the novel safety device.

Figure 2 is a similar view showing the device in operation with the energy absorbing piston being released.

Figure 3 is a side view of the safety mechanism in the next progressive step at the moment the piston encounters an obstruction.

Fig. 3A is a blown-up side view of the upstanding post and the slidable hollow post thereon.

Figure 4 is a view similar to Figures 1 and 2 showing the final step in the sequence when the collision has occurred and the occupants have been moved out of the line of the collision.

Figure 5:
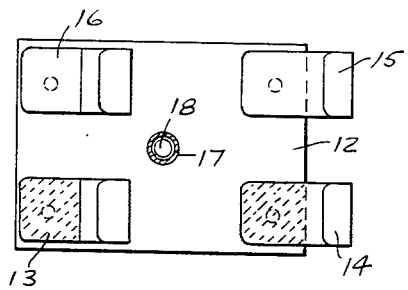
Figure 5 is a horizontal section taken along plane 5—5 of Figure 4 showing details of the safety compartment prior to collision.

Referring now to Figure 1, a passenger vehicle 10 is seen provided with an escape compartment 11 comprising a platform 12 having seats 13, 14, 15 and 16 mounted on the platform (see also Figure 5). The platform 12 is integrally attached to a hollow post 17 which is slidingly mounted on a shaft 18 rigidly affixed to the chassis 19 by a fixture 20 at an approximately central location in the vehicular body. The superstructure of compartment 11, including the roof, windows, etc. is integral with post 17 at its upper end. In the normal position, the lower peripheral edge 21 of compartment 11 rests in a sealed groove 22 of the lower fixed body portion 23.

As better seen in Figure 3A, the lower portion of shaft 18 is hollow to form a passageway 24 with exit ports 25 communicating with a space 26. The upper end of space 26 is sealed by a wall 27, integral with post 17 and the other end by a shoulder 28 projecting integrally from shaft 18. It should be noted that although shaft 17 is reciprocally disposed relative to shoulder 28 and shaft wall 27 is reciprocally disposed relative to shaft 18, the sliding interfaces in these areas are so constructed that the passage of air there-between is prevented. Thus it is seen that the entry of air from passageway 24 into space 26 will create pressure on wall 27 thereby causing its upward motion along shaft 18. Wall 27 and shoulder 28 also function as guides during such movement.

It should be understood that although air is mentioned here as the medium for causing the ascent of the safety compartment, other fluids such as water, oil, alcohol etc. can obviously be employed without involving inventive faculties.

Air or other suitable fluid medium is introduced to the passageway 24 by means of a conduit 29 (Figure 1) connected to fitting 20 at one end and to a cylinder 30 at its other end. A piston 31 is mounted in cylinder 30 and is caused to reciprocate therein when a collision occurs as will be explained. A check valve 32 is mounted in the end wall of cylinder 30 to permit the entry of air into the cylinder when piston 31 moves away from valve 32 just prior to collision. When the collision occurs, piston 31 is actuated towards valve 32 causing its closure and the passage of air under pressure into conduit 29 and then into shaft passageway 24 ultimately resulting in the upward movement of compartment 11.

It is desirable that the extent of the upward movement of compartment 11 be directly related to the magnitude of the collision. Since the force of the collision is a function of the speed of the vehicle, the invention includes a means for raising the escape compartment a distance varying in accordance with the speed of the vehicle. Thus when a collision is anticipated at low speeds, the escape compartment will be raised a smaller distance; at higher speeds a larger distance. The relationship between the vehicular speed and the extent of vertical movement of the escape compartment is thus controlled in a predetermined fashion as will be now described.

Piston 31 extends through a guide 33 and is rigidly attached at its forward end to a bar 34 which is provided with teeth 35 along its lower side. A spring 36 is mounted over the forward extension of piston 31 and abuts bar 34 at one end and guide 33 at the other end thereby biasing bar 34 and piston 31 forward. A stop 37 retains bar 34 in the position shown in Figure 1 against the action of spring 36. To release bar 34, the operator depresses pedal 38 which causes stop 37 to rotate away from a latch 39 affixed to bar 34 and so permit the spring 36 to propel the bar 34 forward. To control the extent that the bar 34 and piston 31 are moved forward, a cylinder 40 is provided and a piston 41 rigidly secured to bar 34 is mounted for reciprocation in said cylinder 40. Thus the forward movement of bar 34 is dependent upon the resistance that the pressure in cylinder 40 presents to the forward movement of piston 41. The pressure in cylinder 40 is controlled by an air reservoir 42 provided with a butterfly valve 43 at one end normally spring pressed to a closed position. To relieve the pressure in cylinder 40 and reservoir 42, the valve 43 can be opened by actuating a pedal 44, adjacent the operator. Actuation of pedal 44 via linkage 45 opens valve 43, relieves the air pressure in 42 and cylinder 40 in as much as 42 and 40 are in communication through a conduit 46.

Thus when the operator actuates pedal 38, spring 36 will force bar 34 to a predetermined forward position depending upon the normal pressure in cylinder 40. Should the operator desire to project bar 34 to a more forward position, that is when a more severe impact is anticipated, the pedal 44 is also actuated thereby relieving pressure in reservoir 42 and cylinder 40, permitting a more forward movement of bar 34 for purposes as will now be described.

A bumper 47 is rigidly attached to the bar 34 for making the initial contact with the obstruction causing the collision. Thus when bumper 47 has been extended as seen in Figures 2 and 3, it will engage the obstruction 48 and be driven towards the vehicle. This rearward movement of the bumper causes the piston 31 to force air in cylinder 30 against valve 32 and to effect its closure. Air under pressure is then forced through conduit 29 and shaft 18 causing the ascent of escape compartment 11 as described before.

The extent of the ascent of the escape compartment is proportional to the rearward motion of piston 31 and bumper 47 during the collision. Thus the distance which bumper 47 has been projected forward prior to the collision is a measure of the height that escape compartment 11 will attain. Also the height that the escape compartment will attain is a measure of the amount of impact energy absorbed harmlessly by said device. Consequently when the operator realizes that an impact of relatively large proportions is about to occur, he actuates both pedals 44 and 38 whereby the bumper is projected a greater distance in readiness to absorb a greater impact. By means of well known devices, the pressure in reservoir 42 can be controlled responsive to the speed of the vehicular wheels to cause a specific pressure corresponding to a specific speed. This may be done by connecting the valve 43, directly with the speedometer cable thus providing an automatic regulation of the pressure in reservoir 42 in an inverse relationship with the vehicular speed.

In order to prevent unwanted up and down motion of seats 13, 14, 15 and 16 during normal travel, post 17 is provided with a flange 49 at its lower end which normally engages a latch 50 and is so prevented from moving upward. Latch 50 is slidably mounted in a slide 51 and actuated therein by a cable 52 attached to a pivoted lever 53. A dog 54 retains lever 53 in the position of Figure 1, prior to collision. When the bumper 47 is extended, dog 54 finally assumes a position shown in Figure 2 wherein one of the teeth 35 is in abutment with the upper end of the dog. Upon impact the teeth are driven rearward causing the clockwise rotation of dog 54 and the counter clockwise rotation of lever 53 as seen in Figure 3. This movement causes cable 52 to retract latch 50, releasing flange 49 and permitting post 17 to move upward.

Figure 6:
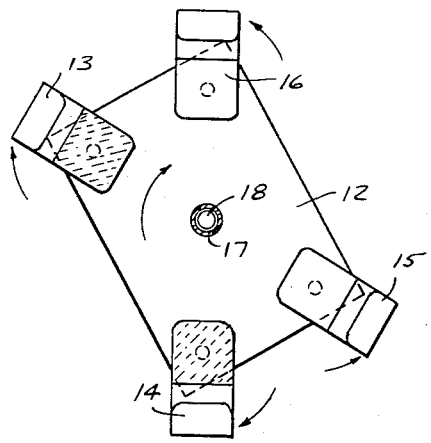
Figure 6 shows the compartment of Figure 5 undergoing rotation as a result of a collision.

Although a substantial portion of the impact energy has been expended harmlessly in raising compartment 11, the sudden stoppage that occurs during the collision can cause injury to the passengers in the seats. To further absorb such energy in a safe manner, provision has been made herein to transform some of the pre-collision linear kinetic energy into post collision rotational kinetic energy; that is, the platform and seats are caused to rotate about the shaft 18. To accomplish this purpose, seats 13 and 14 (see Figures 5 and 1) are made heavier by weights than seats 15 and 16. The weighted seats are crosshatched. Thus the center of mass is not coincident with the center of rotation (shaft 18) and a torque is developed when the vehicle is stopped causing a clockwise rotation as depicted in Figure 6.

Figure 7:
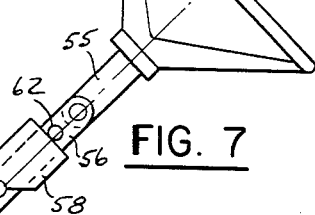
Figures 7, 8 and 9 are elevations of the steering column showing details of its collapsible nature.
Figure 8:
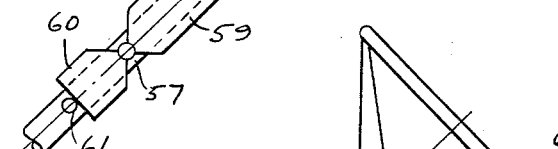
Figure 9:
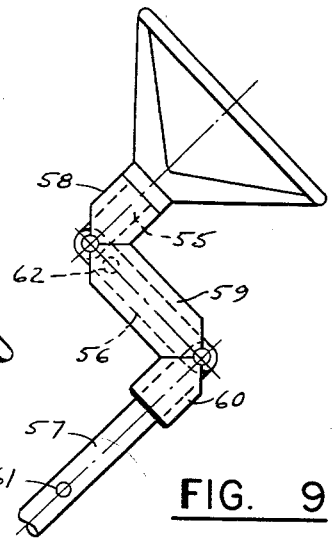

Because the steering wheel and column may obstruct the escaping movement of the operator, a novel steering wheel construction is provided as seen in Figures 7, 8 and 9. The column comprises three hinged sections 55, 56 and 57. A three hinged sleeve 58, 59 and 60 is mounted slidably over the column. In the normal position the sleeve is retained between pins 61 and 62 in a position wherein the column hinges are overlapped by the sleeves retaining the column in rigid axial alignment. Pin 62 is retractible whereby it can be depressed and the sleeve moved to the position of Figure 8 permitting the bending action shown in Figure 9. Thus with a collision imminent the operator presses pin 62 down and moves the sleeve upward so that the column will bend and not obstruct the escape of the operator.

A detailed sequential description of the operation is as follows:

The operator realizing that a collision is imminent depresses pedal 38, which releases bar 34 causing spring 36 to project bumper 47 to the forward position shown in Figure 2. When bumper 47 contacts wall 48, it is driven back into cylinder 30. This movement causes the release of flange 49 by the interaction of dog 54 and lever 53 on latch 50. Continued rearward motion of piston 31 closes valve 32 and builds up pressure in space 26 on wall 27, thereby causing the ascent of compartment 11. Finally the vehicle itself crashes into wall 48 and the complete stoppage sends the eccentrically weighted and now elevated seats into rotation to further expend the energy harmlessly. Prior to collision the operator realizing that his speed is quite high can optionally actuate pedal 44 to relieve pressure in cylinder 40 thereby increasing the forward projection of bumper 47 and the resultant greater ascent and energy absorbing capacity of the escape compartment.

It is thus seen that by using a substantial portion of the kinetic energy at impact to raise the escape compartment, the resultant damage to the vehicle is reduced as well as removing the passengers to a safer zone above the direct axis of impact forces. The rotation of the seat is a further means of cushioning the shock and absorbing energy in a less harmful manner.

Having described in detail the nature of this invention, a grant of Letters Patent is desired for the novel features as expressed in the following claims:

1. An impact absorbing safety device for an automobile, comprising a vehicular body having means for propulsion and an escape compartment adapted to carry passengers, said compartment being movable from a normal position within said body wherein the compartment exterior contours are continuous with and are an integral portion of the body contours, to a position projecting substantially outside of the body, in combination with means for retaining said compartment in the first said position, and means for releasing the second said means and moving the said compartment to the second said position when the body collides with an external obstruction, wherein impact energy is used by the third said means to effect the movement of the compartment to the second said position, said compartment comprising a platform with passenger seats and the vehicular body includes a vertical shaft upon which the platform is centrally mounted in slidable fashion.

2. A device as in claim 1, wherein the platform includes a central hollow post slidably mounted on the shaft and the third said means includes a means for contacting the external obstruction before the body, said third means being movable by such contact to actuate the platform to the second said position of safety.

3. A device as in claim 1, wherein the platform is rotatably mounted on the shaft and includes weights so distributed relative to the shaft axis that the exertion of forces on the platform transverse to the shaft axis due to momentum will cause the platform to spin about the axis when it is in the second said position.

4. An impact absorbing device for a vehicle comprising a vehicular body with means for propulsion and an escape compartment adapted to carry passengers, said compartment being movable from a normal position contiguous with the contours of the body to an escape position substantially outside the confines of the body, in combination with means normally retaining the compartment in the first position and means for releasing the second said means permitting movement of the compartment, including means movable from an internal position in the body to an external position ahead of the body, the fourth said means being manually operable from the internal to the external position, said fourth means being connected to the compartment whereby movement of the fourth said means from the external position to the internal position causes the compartment to move from its position in the body to the escape position outside the body.

References Cited in the file of this patent
UNITED STATES PATENTS

| | | |
|---|---|---|
| 2,379,385 | Styers | June 26, 1945 |
| 2,517,860 | Forgy | Aug. 8, 1950 |

FOREIGN PATENTS

| | | |
|---|---|---|
| 75,057 | Austria | Dec. 10, 1918 |
| 1,122,195 | France | May 14, 1956 |